(12) United States Patent
Jonsson et al.

(10) Patent No.: US 8,411,780 B2
(45) Date of Patent: Apr. 2, 2013

(54) ESTIMATING THE RATIO OF TRAFFIC CHANNEL POWER TO PILOT POWER IN A MIMO WIRELESS COMMUNICATION SYSTEM

(75) Inventors: Elias Jonsson, Malmö (SE); Andreas Cedergren, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 954 days.

(21) Appl. No.: 12/391,796

(22) Filed: Feb. 24, 2009

(65) Prior Publication Data
US 2010/0215075 A1    Aug. 26, 2010

(51) Int. Cl.
H04B 7/02  (2006.01)
H04L 1/02  (2006.01)

(52) U.S. Cl. .......................... 375/267; 375/316

(58) Field of Classification Search ................ 375/260, 375/267, 316, 346, 347
See application file for complete search history.

(56) References Cited

U.S. PATENT DOCUMENTS

| | | | |
|---|---|---|---|
| 6,005,887 A | 12/1999 | Bottomley et al. | |
| 6,507,604 B1 * | 1/2003 | Kuo | 375/148 |
| 2001/0028677 A1 | 10/2001 | Wang et al. | |
| 2003/0031234 A1 | 2/2003 | Smee et al. | |
| 2004/0048619 A1 * | 3/2004 | Kim et al. | 455/452.1 |
| 2005/0111528 A1 | 5/2005 | Fulghum et al. | |
| 2005/0195889 A1 | 9/2005 | Grant et al. | |
| 2005/0201447 A1 | 9/2005 | Cairns et al. | |
| 2006/0255989 A1 * | 11/2006 | Kim et al. | 341/120 |
| 2007/0263704 A1 * | 11/2007 | Nagarajan et al. | 375/148 |
| 2008/0152053 A1 | 6/2008 | Fulghum et al. | |
| 2008/0291978 A1 | 11/2008 | Jonsson et al. | |
| 2009/0286497 A1 * | 11/2009 | Akkarakaran et al. | 455/226.3 |

FOREIGN PATENT DOCUMENTS

| | | |
|---|---|---|
| WO | 2005096517 A1 | 10/2005 |
| WO | 2006037593 A1 | 4/2006 |
| WO | 2006/132593 A2 | 12/2006 |
| WO | 2008/076053 A2 | 6/2008 |

OTHER PUBLICATIONS

Bottomley et al. "A Generalized RAKE Receiver for Interference Suppression." IEEE Journal on Selected Areas in Communications, Aug. 2000, pp. 1536-1545, vol. 18, No. 8, IEEE, Piscataway, NJ, US.

(Continued)

*Primary Examiner* — Sam K Ahn
*Assistant Examiner* — Freshteh N Aghdam
(74) *Attorney, Agent, or Firm* — Coats & Bennett, P.L.L.C.

(57) ABSTRACT

Methods and apparatus for processing a received multi-stream (MIMO) signal, and in particular for estimating a per-code traffic-channel-to-pilot power ratio for the MIMO signal are disclosed. An exemplary method includes the calculation of an average symbol amplitude or average symbol power level from a plurality of de-spread traffic channel symbols received in a first transmission slot and the estimation of a corresponding pilot symbol amplitude or pilot symbol power level, based on an estimated propagation channel response and at least one of a plurality of precoding vectors used to generate the MIMO signal. A per-code traffic-channel-to-pilot power ratio for the first transmission slot is computed by dividing the average symbol amplitude or average symbol power level by the corresponding pilot symbol amplitude or pilot symbol power level.

6 Claims, 5 Drawing Sheets

OTHER PUBLICATIONS

Grant et al., "Generalized RAKE Receivers for MIMO Systems," IEEE Vehicular Technology Conference, Orlando, FL, US, Oct. 6-9, 2003, pp. 424-428, vol. 1, IEEE, Piscataway, NJ, US.

3rd Generation Partnership Project. 3GPP TS 25.214, V8.3.0 (Sep. 2008). 3rd Generation Partnership Project; Technical Specification Group Radio Access Network; Physical layer procedures (FDD) (Release 8). Sep. 2008.

3rd Generation Partnership Project. 3GPP TS 25.101, V8.4.0 (Sep. 2008). 3rd Generation Partnership Project; Technical Specification Group Radio Access Network; User Equipment (UE) radio transmission and reception (FDD) (Release 8). Sep. 2008.

Grant, S. J. "Receiver Parametric Covariance for Precoded MIMO Transmissions." Co-pending U.S. Appl. No. 12/036,323, filed Feb. 25, 2008.

Grant, S. J. "Code Power Estimation for MIMO Signals." Co-pending U.S. Appl. No. 12/036,425, filed Feb. 25, 2008.

Grant, S. J., et al. "Code Power Estimation for MIMO Signals." Co-pending U.S. Appl. No. 12/036,368, filed Feb. 25, 2008.

* cited by examiner

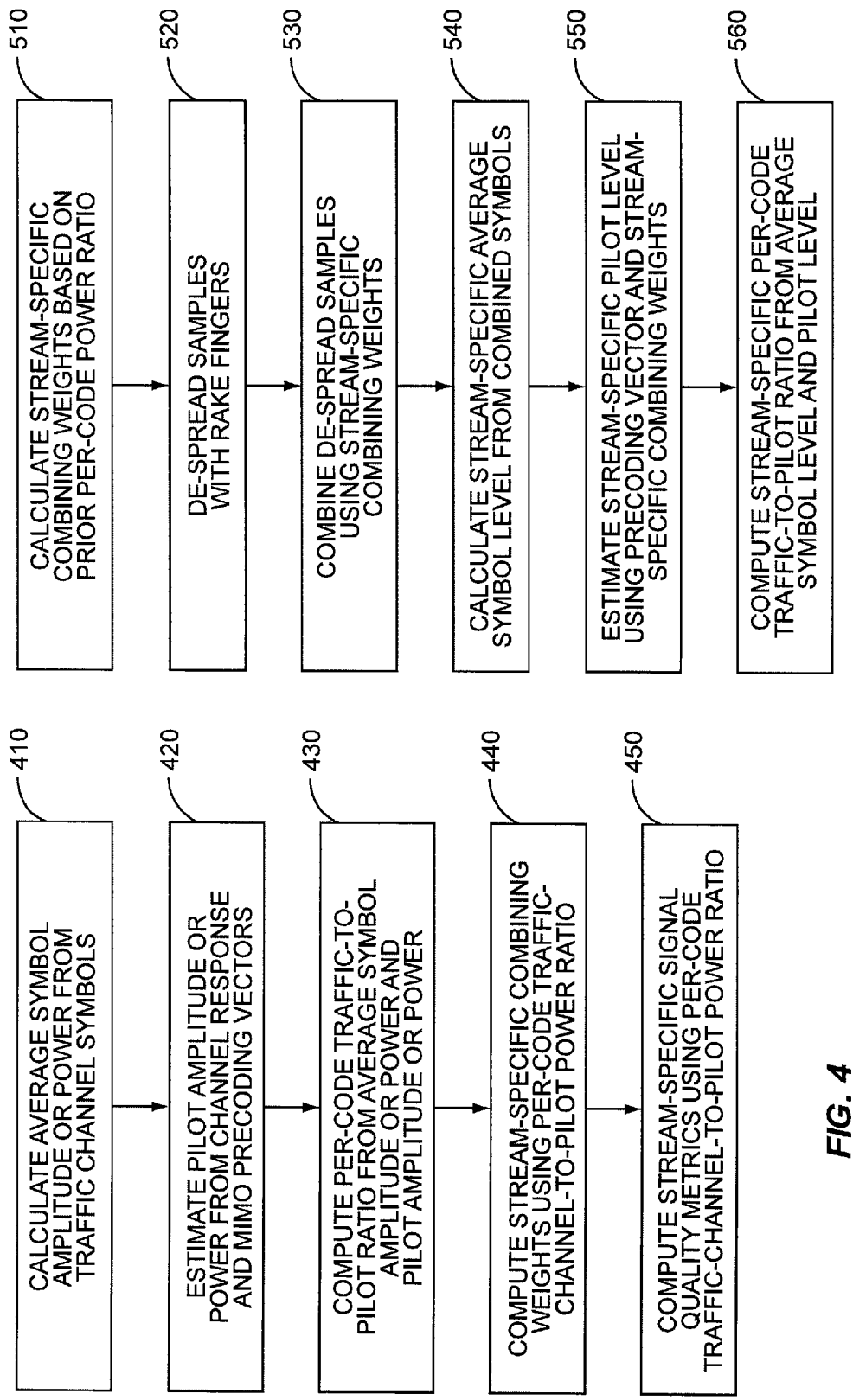

ESTIMATING THE RATIO OF TRAFFIC CHANNEL POWER TO PILOT POWER IN A MIMO WIRELESS COMMUNICATION SYSTEM

TECHNICAL FIELD

The present invention relates generally to wireless telecommunication systems, and relates in particular to methods and apparatus for processing multi-stream multiple-input multiple-output signals in such systems.

BACKGROUND

The 3rd-generation (3G) Wideband Code-Division Multiple Access (W-CDMA) wireless network specified by the 3rd-Generation Partnership Project (3GPP) includes support for multiple-input multiple-output (MIMO) transmission techniques. (For details, see "3rd Generation Partnership Project; Technical Specification Group Radio Access Network; Physical layer procedures (FDD) (Release 8)," 3GPP TS 25.214, available at http://www.3gpp.org/ftp/Specs/html-info/25214.htm.) In systems built according to these standards, a 2×2 MIMO scheme may be used to transmit the High-Speed Downlink Shared Channel (HS-DSCH) over two transmit antennas via two distinct spatially multiplexed data streams. The two streams use the same channelization codes, but are separated from each other by orthogonal preceding weights.

Because of imperfections in the radio propagation channel between the transmitting base station and a mobile terminal, the two streams will interfere with each other. This interference is referred to as code reuse interference. For optimal performance, a MIMO receiver needs to suppress or cancel this interference. In addition to suppressing code reuse interference, a MIMO receiver also needs an estimate of the code reuse interference power to compute accurate channel quality reports for feeding back to the base station. If the receiver computes channel estimates based on pilot channel symbols (e.g., the W-CDMA Common Pilot Channel, or CPICH), the ratio of the traffic channel power (e.g., the W-CDMA High-Speed Physical Downlink Shared Channel, or HS-PDSCH) to the pilot channel power, per channelization code must be known or estimated. This per-code traffic-channel-to-pilot power ratio $\alpha_{PC}$ is used when suppressing or cancelling the code reuse term and may also be used to calculate an estimate of the received signal-to-interference-plus-noise ratio (SINR) for channel quality reporting.

One approach to suppressing code reuse interference in a Generalized Rake (G-Rake) receiver is described in U.S. Patent Application Publication No. 2008/0152053, titled "Method and Apparatus for Determining Combining Weights for MIMO Receivers" and published 26 Jun. 2008, the entire contents of which are incorporated by reference herein. With this approach, a receiver uses scaling parameters representing the normalized per-code energy allocated to each transmitted stream to calculate combining weights that suppress the cross-stream interference. These same scaling parameters may also be used to calculate the estimated code reuse interference power for the purposes of preparing channel quality reports.

Techniques for estimating the per-code traffic-channel-to-pilot power ratio $\alpha_{PC}$ in a MIMO system are disclosed in U.S. patent application Ser. Nos. 12/036,425 and 12/036,368, both of which were filed Feb. 25, 2008 and both of which are titled "Code Power Estimation for MIMO Signals." The entire contents of both of these applications are incorporated by reference herein. However, these or other previously known techniques may be unnecessarily complex, in some situations, or may overestimate $\alpha_{PC}$, or may yield excessively noisy estimates for $\alpha_{PC}$.

SUMMARY

Various embodiments of the present invention estimate a per-code traffic-channel-to-pilot power ratio for a received multi-stream MIMO signal by dividing an average traffic channel symbol amplitude or power level, obtained from a plurality of de-spread traffic channel symbols, by a corresponding pilot symbol amplitude or power level obtained from an estimated propagation channel response and one or more of the precoding vectors used to generate the MIMO signal.

An exemplary method for implementing in a wireless receiver configured to process a received multi-stream MIMO signal thus includes the calculation of an average symbol amplitude or average symbol power level from a plurality of de-spread traffic channel symbols received in a first transmission slot and the estimation of a corresponding pilot symbol amplitude or pilot symbol power level, based on an estimated propagation channel response and at least one of a plurality of preceding vectors used to generate the MIMO signal. A per-code traffic-channel-to-pilot power ratio for the first transmission slot is computed by dividing the average symbol amplitude or average symbol power level by the corresponding pilot symbol amplitude or pilot symbol power level.

In some embodiments, the average symbol amplitude or average symbol power level is calculated by de-spreading samples of the received signal at each of multiple time delays and combining the de-spread samples using stream-specific combining weights corresponding to a first stream of the MIMO signal, to obtain each of a plurality of combined traffic channel symbols, and calculating the average symbol amplitude or average symbol power level from the plurality of combined traffic channel symbols. In some of these embodiments, the stream-specific combining weights are first calculated using the estimated propagation channel response, the precoding vectors used to generate the MIMO signal, and a previously calculated per-code power ratio computed for a prior transmission slot. In some of these latter embodiments, the previously calculated per-code ratio is computed as a weighted average of per-code power ratios computed for two or more prior transmission slots. In other embodiments, the stream-specific combining weights are instead computed from the estimated propagation channel response, the precoding vectors used to generate the MIMO signal, and a previously calculated per-code power ratio estimated from a power ratio parameter signaled to the wireless receiver by a base station.

In several embodiments of the invention, the corresponding pilot symbol amplitude or pilot symbol power level is estimated as a function of the estimated propagation channel response, the precoding vector for a first stream of the MIMO signal, and stream-specific combining weights corresponding to the first stream of the MIMO signal.

In some embodiments, rather than using symbol values obtained by combining de-spread values with stream-specific combining weights, an average symbol amplitude or average symbol power level is calculated from a plurality of de-spread traffic channel symbols received in a first transmission slot by selecting a signal processing delay corresponding to a strongest signal propagation path from a plurality of signal processing delays, de-spreading samples of the received signal at the selected signal processing delay to obtain each of a plurality of single-delay de-spread values, and calculating the average symbol amplitude or average symbol power level for a first stream of the MIMO signal from the single-delay de-spread values, an estimated multi-antenna channel propagation response corresponding to the selected signal processing delay, and the preceding vector for the first stream of the MIMO signal. In some of these embodiments, the corresponding pilot symbol amplitude or pilot symbol power level is estimated by calculating the estimated pilot symbol amplitude or pilot symbol power level as a function of the precoding vector for the first stream of the MIMO signal and the estimated multi-antenna channel propagation response corresponding to the selected signal processing delay.

In other embodiments, an average symbol amplitude or average symbol power level may be estimated from a plurality of single-finger de-spread traffic channel symbols received in a first transmission slot by selecting a signal processing delay corresponding to a strongest signal propagation path from a plurality of signal processing delays, de-spreading samples of the received signal at the selected signal processing delay to obtain each of a plurality of single-delay de-spread values, and calculating the mean power of the plurality of single-delay de-spread values to obtain the average symbol power level.

Any of the above described methods may further include the calculation of a filtered power ratio for the first transmission slot by computing a weighted average of the per-code traffic-channel-to-pilot power ratio for the first transmission slot and one or more per-code power ratios computed for prior transmission slots. Any of the above described methods may also include the computation of stream-specific combining weights for a first stream of the MIMO signal as a function of the per-code traffic-channel-to-pilot power ratio for the first transmission slot, the estimated propagation channel response, and the preceding vectors used to generate the MIMO signal, and/or the computation of a stream-specific signal quality metric for the first stream of the MIMO signal as a function of the per-code traffic-channel-to-pilot power ratio for the first transmission slot, the estimated propagation channel response, and the preceding vector for the first stream of the MIMO signal.

Further embodiments of the present invention include a wireless receiver apparatus (which may be embodied in a wireless transceiver configured for operation with one or more wireless standards) that includes one or more processing circuits configured to carry out one or more of the MIMO signal processing techniques described herein. Of course, those skilled in the art will appreciate that the present invention is not limited to the above features, advantages, contexts or examples, and will recognize additional features and advantages upon reading the following detailed description and upon viewing the accompanying drawings.

BRIEF DESCRIPTION OF THE DRAWINGS

FIG. 4 is a process flow diagram illustrating an exemplary method of processing a received MIMO signal.

FIG. 5 is a process flow diagram illustrating an exemplary method of estimating stream-specific traffic-to-pilot power ratios, according to some embodiments of the invention.

DETAILED DESCRIPTION

Embodiments of the present invention are described herein with respect to specifications for MIMO operation in W-CDMA standards, which operation is more fully described below. However, the invention is not so limited, and the inventive concepts disclosed and claimed herein may be advantageously applied to a wide array of transmit diversity systems. Furthermore, the use of the term "exemplary" is used herein to mean "illustrative," or "serving as an example," and is not intended to imply that a particular embodiment is preferred over another or that a particular feature is essential to the present invention. Likewise, the terms "first" and "second," and similar terms, are used simply to distinguish one particular instance of an item or feature from another, and do not indicate a particular order or arrangement, unless the context clearly indicates otherwise.

Figure 1:
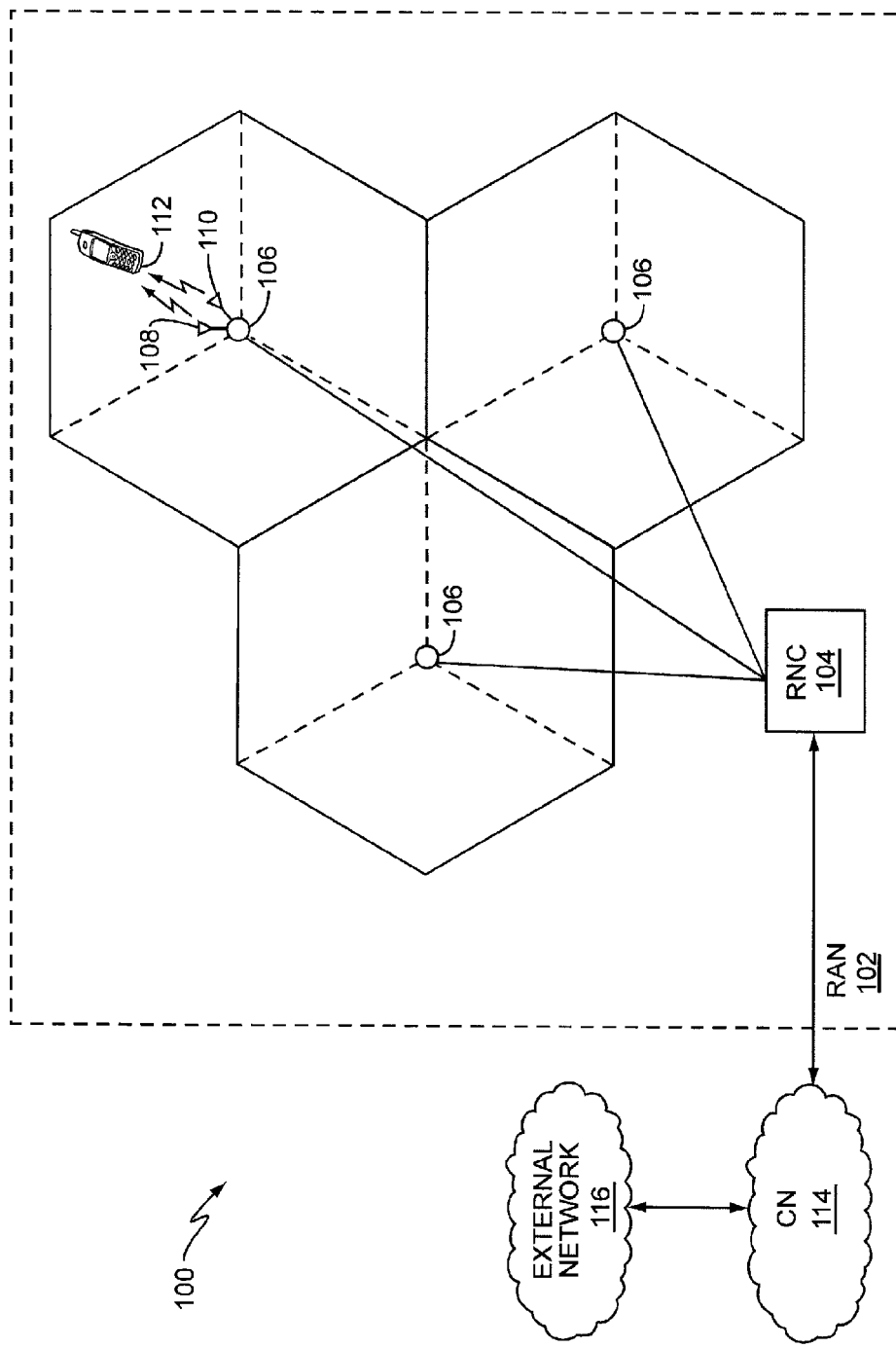
FIG. 1 is a functional block diagram of a wireless communication system.

FIG. 1 depicts an exemplary wireless communication system 100 employing multiple-input multiple-output (MIMO) transmissions, such as according to the 3GPP W-CDMA specifications. Within a Radio Access Network (RAN) 102, a Radio Network Controller (RNC) 104 controls a plurality of base transceiver stations (BTS) 106, also known in the art as Node B's. Each Node B 106 provides radio communication services with subscriber mobile terminals 112 within a geographic area called a cell, which may be divided into sectors, as depicted in FIG. 1. The RNC 104 communicates with a Core Network (CN) 114, which in turn is connected to one or more external networks 116, such as the Public Switched Telephone Network (PSTN), the Internet, or the like.

Figure 2:
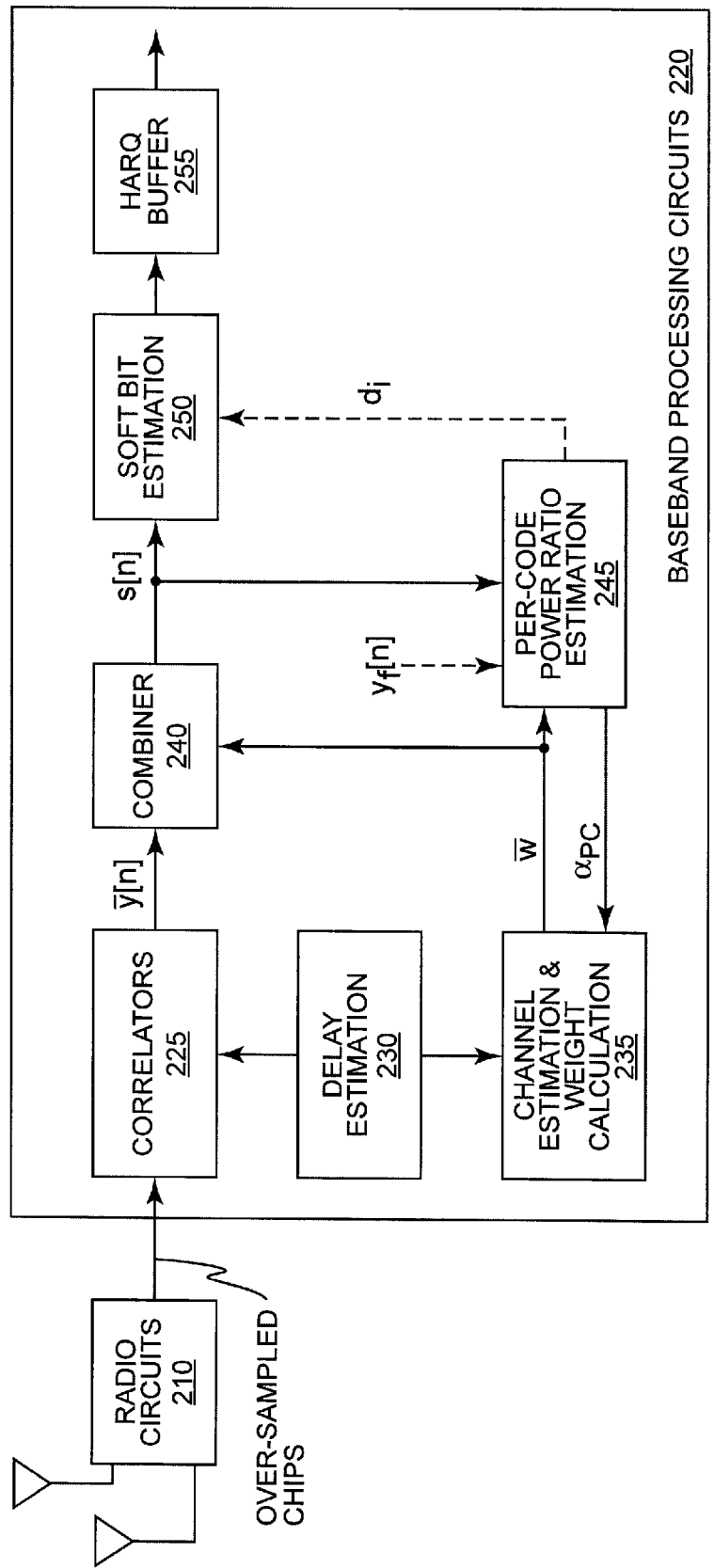
FIG. 2 is a functional block diagram of an exemplary wireless receiver configured to process received MIMO signals.

Each base station 106 includes at least a primary transmit antenna 108 and a secondary transmit antenna 110 (either per-cell or per-sector, depending on the network 100 configuration), as shown in FIG. 2. The base station 106 may transmit an information signal, such as a precoded voice signal or a precoded High-Speed Downlink Packet Access (HSDPA) data signal, using both antennas 108 and 110. The signal transmitted on the secondary antenna 110 is weighted relative to the signal transmitted on the primary antenna 108, wherein the transmit weights may comprise phase offset only, or may more generally comprise a complex quantity having both phase and amplitude. The phase shift employed may be determined by feedback from the mobile terminal 112, thus forming a closed-loop transmit diversity system.

In a co-pending patent application titled "Receiver Parametric Covariance Estimation for Precoded MIMO Transmissions," U.S. patent application Ser. No. 12/036,323, the entire contents of which are incorporated by reference herein, a MIMO G-Rake receiver based upon the most general G-Rake formulation for MIMO is disclosed. For a 2×2 MIMO scenario, this receiver computes impairment covariance matrices corresponding to the first and second streams of a dual-stream precoded signal as:

$$R_{stream0} = R + \alpha_{PC}(1) h_{\textit{eff}}(b_1) h_{\textit{eff}}^H(b_1) \qquad (1)$$

and $$R_{stream1} = R + \alpha_{PC}(0) h_{\textit{eff}}(b_0) h_{\textit{eff}}^H(b_0) \qquad (2)$$

Here, R is that portion of the impairment covariance not including the code-reuse interference. In other words, R captures impairment covariance arising from inter-symbol interference (ISI), multiple access interference (MAI), and noise. The second term in each expression is the code-reuse interference term.

In Equations (1) and (2), the code-reuse interference term is a function of the effective net response corresponding to the interfering stream. For stream 0, for example, the interfering stream is stream 1, and the code-reuse term is a function of $h_{\textit{eff}}(b_1)$; for stream 1, the interfering stream is stream 0, and the code-reuse term is a function of $h_{\textit{eff}}(b_0)$. The vectors $b_0$ and $b_1$ are the preceding vectors applied to streams 0 and 1, respectively.

More particularly, if n indexes data streams, then the effective net response vector corresponding to the $n^{th}$ stream is given by:

$$h_{\textit{eff}}(b_n) = b_{0n} h_1 + b_{1n} \sqrt{\frac{\gamma_p(1)}{\gamma_p(2)}} h_2, \qquad (3)$$

where $b_n = [b_{1n} \ b_{2n}]^T$ is the preceding vector applied to the $n^{th}$ data stream. The vector $h_m$ is the net channel response associated with the $m^{th}$ transmit antenna (m=1 or 2), and $\gamma_p(1)$ and $\gamma_p(2)$ denote the fraction of the total pilot power allocated to the first and second transmit antennas, respectively. Each element of the net response vector $h_m$ corresponds to a given Rake finger. For example, for finger f (associated with delay $d_f$ and receive antenna 1), the corresponding net channel response vector element is given by:

$$h_m(f) = \sum_{p=0}^{P-1} g_m(p, l) R_{TX/RX}(d_f - \tau_p), \qquad (4)$$

where P is the number of paths, $g_m(p,l)$ is the channel estimate (medium response) associated with transmit antenna m, receive antenna l and path delay $\tau_p$, and $R_{TX/RX}(\tau)$ represents the convolution of the transmit and receive pulse shaping filters.

In Equations (1) and (2), the code-reuse terms include a scaling factor, $\alpha_{PC}(n)$, representing the per-code energy allocated to interfering stream n. Assuming uniform power distribution across channelization codes, the per-code energy for the $n^{th}$ stream is given by:

$$\alpha_{PC}(n) = \left(\frac{1}{\gamma_p(1) N_p}\right) \left(\frac{N_s}{K}\right) \gamma_d(n) \Gamma_{D/P}. \qquad (5)$$

Here, K is the number of channelization codes used for each data stream (and is the same for each stream) and $\Gamma_{D/P}$ is the ratio of the power allocated to the data channel (in the W-CDMA specifications, the High-Speed Downlink Shared Channel, or HS-DSCH) to the total power allocated to the pilot channels (in W-CDMA, the Common Pilot Channel, or CPICH). The quantity $\gamma_d(n)$ denotes the fraction of the total data power allocated to the $n^{th}$ data stream, and $\gamma_p(1)$ denotes the fraction of the total pilot power allocated to the first transmit antenna. The quantities $N_s$ and $N_p$ represent the spreading factors used for the data channel (typically sixteen) and the pilot channel (typically 256), respectively.

Given the preceding construction, the per-code energies $\alpha_{PC}(0)$ and $\alpha_{PC}(1)$ are needed by a receiver to compute the stream-specific covariance matrices $R_{stream0}$ and $R_{stream1}$. Typically, all of the quantities in Equation (5) are known to the receiver, with the possible exception of the data-to-pilot power ratio $\Gamma_{D/P}$. In the 3GPP W-CDMA specifications, a provision exists for explicit signaling of the data-to-pilot power ratio. In this case, a mobile station may simply obtain a value for $\Gamma_{D/P}$ via a downlink control channel, and compute the per-code energies $\alpha_{PC}(n)$ directly, using Equation (5). Another possible approach, where a value for $\Gamma_{D/P}$ cannot be obtained by signaling, is to simply use a pre-determined, nominal value for $\Gamma_{D/P}$. However, both of these approaches suffer in accuracy. In the first case, a value for $\Gamma_{D/P}$ obtained by explicit signaling can rapidly become out of date, since specifications currently call for signaling $\Gamma_{D/P}$ on an infrequent basis. In the second case, the computed values for $\Gamma_{D/P}$ may be very inaccurate when the actual data-to-pilot ratio strays significantly from the nominal, "assumed" value. Hence, methods for estimating per-code energies $\alpha_{PC}(n)$, or alternatively, for estimating a value for $\Gamma_{D/P}$ in order to facilitate calculation of the per-code energies, are needed.

In one approach, the per-code traffic-to-pilot power ratio is computed using the parametric GRAKE. The parametric GRAKE models the impairment as a covariance matrix expressed as:

$$R = \alpha R_{ISI} + \beta R_{Noise}, \qquad (6)$$

where the covariance matrix consists of a sum of two weighted matrices. One matrix $R_{ISI}$ models the inter-symbol interference (ISI) and the other matrix $R_{Noise}$ models white noise and other un-modeled interference. The a parameter corresponds to the total transmitted power from the Node B. If the approximation is made that all transmitted power except for CPICH is used for HS-PDSCH, and if the transmitted power is equal on both streams, then the per-code traffic-to-pilot power ratio $\alpha_{PC}$ can be approximated as:

$$\alpha_{PC} \approx \frac{1}{K} \frac{N_s}{N_p} (\alpha N_p - 1) = \frac{1}{K}(16\alpha - 1/16), \qquad (7)$$

where K is the number of channelization codes and $N_s$ and $N_p$ again represent the spreading factors used for the data channel (typically sixteen) and the pilot channel (typically 256).

This approach tends to overestimate the per-code traffic-to-pilot power ratio. Also, the estimation can be excessively noisy. Another approach, as detailed further herein, is to re-use the demodulation decision boundary that is typically computed in the soft value generation process. The decision boundary is computed, based on received traffic data symbols, and used to de-map the received symbols from higher order modulation constellations, such as 16 QAM and 64 QAM, to obtain soft bit values for decoding. In some embodiments of the invention, then, as detailed below, a decision boundary is computed, the decision boundary representing an estimate of the amplitude or power of the complex valued received data symbols. A corresponding calculation is performed for the received CPICH symbols. Finally, an estimate of $\alpha_{PC}$ can be found by forming the ratio of the decision boundary estimates for the traffic channel data and the amplitude or power of the CPICH. As seen below, several variants of this general approach are possible.

FIG. 2 is a block diagram providing an overview of a wireless receiver configured to process received MIMO signals according to one or more of the techniques disclosed herein. Generally speaking, signals received via two (or more) antennas are conditioned, downconverted, and digitally sampled by radio circuits 210, which are configured to receive radio signals formatted according to one or more wireless communication standards such as the 3GPP standards for W-CDMA. Radio circuits 210 thus generate chip samples from the received signal, which includes the information signal transmitted from antennas 108 and 110 at base station 106, and provide the chip samples to baseband processing circuits 220 for demodulation, detection, and further processing.

Figure 3:
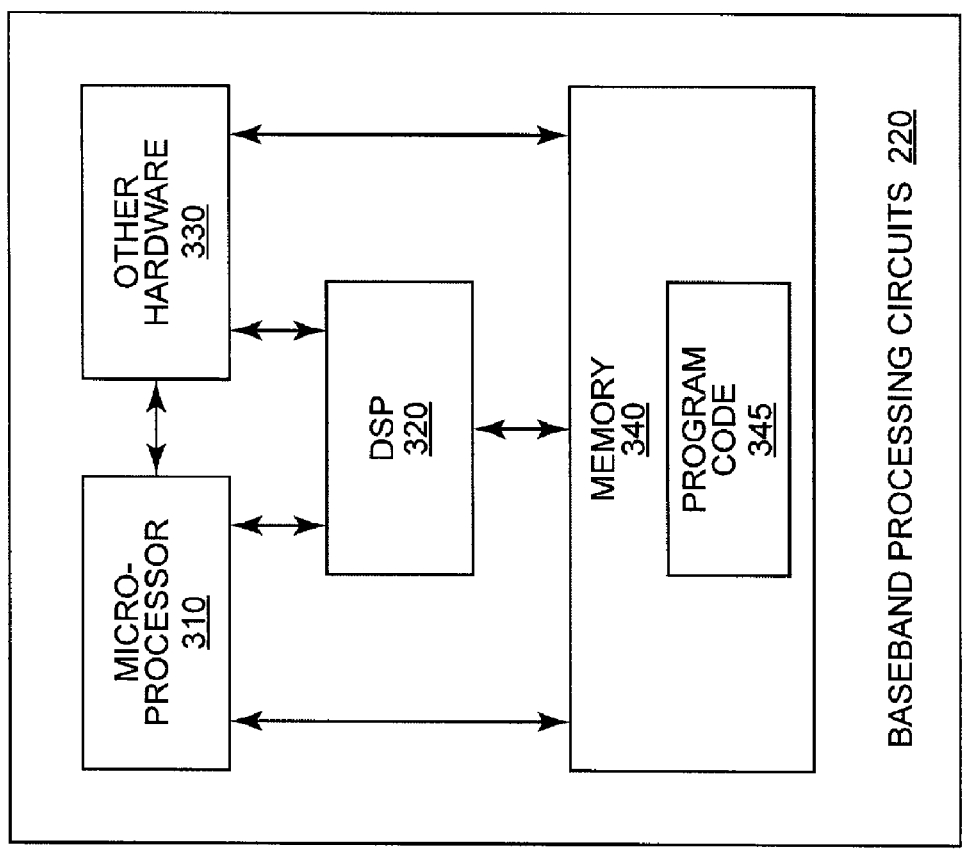
FIG. 3 illustrates exemplary baseband processing circuits for a wireless receiver.

In the block diagram of FIG. 2, the details of baseband processing circuits 220 are illustrated in terms of functional blocks, which include correlators 225, delay estimation circuit 230, channel estimation and weight calculation circuit 235, combiner 240, per-code power ratio estimation circuit 245, soft bit estimation circuit 250, and HARQ buffer 255. Of course, the functional block diagram of FIG. 2 is simplified; those skilled in the art will appreciate that a number of features and elements not necessary to a complete understanding of the present invention are omitted. Further, those skilled in the art will appreciate that the functions illustrated in FIG. 2 may be implemented using a variety of programmable devices, digital hardware, or combinations thereof. FIG. 3 thus illustrates an exemplary implementation of baseband processing circuits 220, in which the processing circuits 220 comprise micro-processor circuits 310, digital-signal processing (DSP) circuits 320, and other digital hardware 330, each of which has access to memory 340. Memory 340 includes stored program code 345, which is executed by at least microprocessor circuits 320.

Like FIG. 2, the schematic diagram of FIG. 3 is simplified; those skilled in the art will again appreciate that a number of features and elements not necessary to a complete understanding of the present invention are omitted. Those skilled in the art will thus appreciate that baseband processing circuits 220 may, in various embodiments, comprise one or several microprocessors, microcontrollers, digital signal processors, and the like, each of which may be configured with appropriate software and/or firmware to carry out all or parts of the various functions illustrated in FIG. 2, and may further comprise various digital hardware blocks configured to carry out all or parts of those various signal processing tasks. Baseband processing circuits 220 may be implemented with one or more application-specific integrated circuits (ASICs), off-the-shelf digital and analog hardware components, or some combination of ASICs and off-the-shelf hardware. Memory 340 may include several different types, including, but not limited to, flash, read-only memory (ROM), random-access memory (RAM), cache memory, etc., and may be implemented completely or partially on-board one or more ASICs, or using memory devices separate the remaining circuits of baseband processing circuits 220, or with some combination of these approaches.

Referring once again to FIG. 2, the over-sampled chip samples produced by radio circuits 210 are provided to baseband processing circuits 220 for interference suppression, demodulation, and detection. In particular, the chip samples are fed to an array of correlators 225, typically called "fingers," where the samples are correlated with the channelization codes, or "de-spread," at each of several delays to produce a vector of de-spread values y[n] for each received symbol. The specific delays used by the correlators 225 are determined by the delay estimation circuit 230, and typically include delays corresponding to the strongest multipath "rays" in the received signal. The characteristics of the propagation channel between the transmit antennas and the receive antennas are measured by the channel estimation and weight calculation circuit 235, based on the finger delays and the received pilot symbols. The channel estimation & weight calculation circuit 235 also computes interference-suppressing combining weights, w, which are used in combiner 240 combine the de-spread values y[n] in a combiner 240 to produce "soft values" s[n], i.e., estimates of the transmitted symbol values.

The de-spread HS-PDSCH symbols output by the correlators 225 in FIG. 2 may be denoted as:

$$y[n]=Hb_0s_0[n]+Hb_1s_1[n]+U, \quad (8)$$

where $b_i$ is the 2×1 pre coding weight vector, H is an N×2 channel response matrix where N is the number of delays/fingers, $s_i[n]$ is the data symbol for stream i, and U is all other interference. In some embodiments, the weight calculation circuit 235 computes intermediate weights, i.e., weights with a rank-one update to account for code reuse interference, according to:

$$v_0=Hb_0/R$$

$$v_1=Hb_1/R, \quad (9)$$

where R is the impairment covariance matrix estimated for all N fingers.

Next, a rank-one update of the N×1 combining weight vectors may be computed by the weight calculator 235 to obtain stream-specific combining weight vectors that account for code re-use interference, according to:

$$w_0 = v_0 - \frac{\alpha_{pc}(1)v_1^H Hb_0}{1+\alpha_{pc}(1)v_1^H Hb_1}v_1 \quad (10)$$

$$w_1 = v_1 - \frac{\alpha_{pc}(0)v_0^H Hb_1}{1+\alpha_{pc}(0)v_0^H Hb_0}v_0,$$

where the stream-specific traffic-to-pilot power ratios $\alpha_{pc}(0)$ and $\alpha_{pc}(1)$ (corresponding to streams 0 and 1, respectively) compensate for using pilot symbols to estimate the channel and are computed by per-code power ratio estimation circuit 245 according to one of the techniques described in detail below. The received combined symbol, computed in the combiner 240 in the receiver of FIG. 2, can then be written as:

$$\tilde{s}_0[n]=w_0^H y[n]$$

$$\tilde{s}_1[n]=w_1^H y[n]. \quad (11)$$

The combined symbol value estimates $\tilde{s}_0[n]$ and $\tilde{s}_1[n]$ are supplied to soft bit estimation circuit, which de-maps the symbol values into soft bit values according to the modulation constellation used to generate the transmitted signals and a decision boundary estimate ($d_i$), an. The decision boundary estimate, which is based on the amplitude of the received traffic channel symbols, may in some embodiments be calculated in the per-code power ratio estimation circuit 245 as part of traffic-to-pilot power ratio estimation process, as will be discussed in detail below. In any event, the soft bit values produced by the soft bit estimation circuit 250 are fed to a HARQ buffer circuit for detection and decoding.

Because the CPICH signal-to-interference-plus-noise ratio must be computed for channel-quality-indicator (CQI) reporting, in some embodiments, the channel estimation and weight calculation circuit 235 may be configured to calculate stream-specific SINR's according to:

$$SINR_{dual,0} = \frac{|w_0^H b_0 H|^2}{w_0^H R w_0 + \alpha_{pc}(1)|w_1^H b_0 H|^2} \quad (12)$$

$$SINR_{dual,1} = \frac{|w_1^H b_1 H|^2}{w_1^H R w_1 + \alpha_{pc}(0)|w_0^H b_1 H|^2}.$$

This calculation further depends on the stream-specific traffic-to-pilot power ratios.

In some embodiments, the HS-PDSCH to CPICH power ratio parameter $\Gamma_{D/P}$, sent to the mobile terminal from the Node B, may be used by the mobile terminal to calculate SINR for CQI reporting. The per-code traffic-to-pilot power ratio may be estimated directly from the power ratio parameter $\Gamma_{D/P}$:

$$\alpha_{PC} = \frac{\Gamma_{D/P}}{15}, \quad (13)$$

since the 3GPP standards (3GPP TS 25.214) specify that 15 codes should be assumed for the CQI reporting. The same $\alpha_{PC}$ could also be used for computing the combining weights, however as noted above the risk is that the Node B actually uses a different power ratio for one or more transmission-time-intervals (TTIs).

Accordingly, in some embodiments of the invention, the per-code traffic-to-pilot power ratio used to calculate the combining weights is derived from the decision boundary estimate used for demodulating the received traffic data, whether the traffic data is modulated Quadrature Phase-Shift Keying (QPSK), 16-level Quadrature Amplitude Modulation (16 QAM), or 64-level Quadrature Amplitude Modulation (64 QAM). In some embodiments, the decision boundary estimate is obtained by averaging the absolute mean value of combined HS-PDSCH symbols. Thus, for stream 0, the decision boundary estimate may be calculated as:

$$d_0 = \frac{1}{2N} \sum_{n=0}^{N} (|\text{Re}\tilde{s}_0[n]| + |\text{Im}\tilde{s}_0[n]|), \quad (14)$$

where N is the number of HS-PDSH symbols used in the estimate. In some embodiments, the estimate may be computed using all symbols in a given slot.

Once the decision boundary estimate $d_0$ is obtained, $\alpha_{PC}(0)$ can then be estimated by dividing the decision boundary estimate by a corresponding estimate of the pilot symbol amplitude, scaling, and squaring:

$$\alpha_{pc}(0) \approx \left( m \cdot \frac{2d_0}{|\text{Re}(w_0^H H b_0)| + |\text{Im}(w_0^H H b_0)|} \right)^2, \quad (15)$$

where the scaling factor m depends on the modulation used for the traffic data. For QPSK modulation, m=1, for 16 QAM, m=$\sqrt{5/4}$, and for 64 QAM, m=$\sqrt{21/16}$. The factor m compensates for the fact that absolute values are used instead of power estimates to compute the traffic-to-pilot power ratio. Corresponding equations may be used to separate calculate an estimate for $\alpha_{pc}(1)$, corresponding to stream 1. Alternatively, it may be assumed, in some embodiments and/or under some circumstances, that $\alpha_{pc}(0)$ and $\alpha_{pc}(1)$ are equal.

With the above approach, the power ratio estimate $\alpha_{PC}$ will be delayed by one slot or at least delayed for the demodulation of the first stream, as combined symbols š[n] are needed to obtain the decision boundary estimate. For the 2 last slots in a W-CDMA TTI, the $\alpha_{PC}$ computed in the previous slot can be used, since $\alpha_{PC}$ remains constant during a TTI. For the third and last slot in the TTI, the two previous $\alpha_{PC}$ values may be averaged, in some embodiments to reduce noise in the estimate. However, since the actual per-code traffic-to-pilot ratio may vary from one TTI to another, the estimation of $\alpha_{PC}$ for use in the first slot may be performed differently in some embodiments. One approach is to use the HS-PDSCH to CPICH power ratio parameter $\Gamma_{D/P}$, signaled to the mobile terminal by the Node B, for estimating $\alpha_{PC}$ for the first slot of the TTI, e.g., according to Equation (13) above.

Another approach is to make the assumption that the $\alpha_{PC}$ is fairly constant from TTI to TTI, and thus carry over the $\alpha_{PC}$ from the previous TTI. In some embodiments according to this approach, the per-code traffic-to-pilot power ratio is filtered, e.g., according to:

$$\alpha_{PC\_filtered,n} = \lambda \alpha_{PC\_filtered,n-1} + (\lambda-1)\alpha_{PC,n-1}, \quad (16)$$

where the index n refers to the TTI and the filtered value is updated after the first slot in TTI n is processed. $\lambda$ is a filter factor that sets a time constant for the smoothing operation; $\lambda$ may be set to 0.5, for example, or to some other suitable value as determined by simulation, testing, or the like. An initial value (e.g., for the very first TTI processed) for $\alpha_{PC}$ may be computed from the signalled power ratio parameter $\Gamma_{D/P}$, e.g., according to Equation (15).

Yet another way to get an $\alpha_{PC}$ value for the first slot in a TTI involves using Equation (7). First, for every slot solve for a in Equation (7) and call the result $\tilde{\alpha}$. That is, compute:

$$\tilde{\alpha} = \frac{1}{16}\left( K\alpha_{PC} + \frac{1}{16} \right), \quad (17)$$

where $\alpha_{PC}$ is the most recently estimated $\alpha_{PC}$ value. $\tilde{\alpha}$ may then be averaged or filtered over several slots to obtain a filtered value $\alpha'$. Here, $\alpha'$ is a measure of the transmitted cell power, which should stay fairly constant. Equation (7) may then be used, substituting $\alpha'$ for $\alpha$, to obtain a value for $\alpha_{PC}$ to use for the current slot. Those skilled in the art will appreciate that solving for $\alpha$ in Equation (7) further involves the approximation that all codes are sent with same power across users, which is not always true but may be a fair approximation in many circumstances.

As noted above, the previous approach for estimating the traffic-channel-to-pilot power ratio based on a decision boundary estimate computed from Rake-combined symbol values yields an estimated value for $\alpha_{PC}$ that is delayed by one slot. An alternative approach is to do a "dry run" over a given slot, such as the first slot in a TTI, for estimating $\alpha_{PC}$, and then re-processing the slot with combining weights computed using the estimated $\alpha_{PC}$. Thus, tentative combining weights, (such as the combining weights for a previous slot, or combining weights computed according to the most recent estimate of $\alpha_{PC}$) are used in a first pass of the slot data, to obtain an estimate of $\alpha_{PC}$. The combining weights may then be re-calculated, using the updated $\alpha_{PC}$, for generating the soft values and soft bits used for detecting the received signal.

Of course, those skilled in the art will appreciate that this alternative requires running some or all of the decision boundary estimation, combining weight calculation, and $\alpha_{PC}$ calculations twice. This may prove to be too complex an approach for some applications. Thus, several less complex alternatives are based on the use of only a single Rake finger to estimate the amplitude or power level of the received traffic data symbols. Generally this should be the finger corresponding to the strongest propagation path, e.g., as determined by the delay estimation circuit of FIG. 2.

If a single processing delay (e.g., Rake finger) is used, the channel estimate $H_f$ corresponding to that delay may be used as a weight. (Those skilled in the art will appreciate that $H_f$ is a 2×2 matrix in a 2×2 MIMO system, with the four entries corresponding to the propagation channels between each of the two transmit antennas and the two receive antennas.) Along with the precoding vectors used to generate the MIMO signal, the channel estimate $H_f$ can be used to estimate the per-code traffic-channel-to-pilot power ratio $\alpha_{PC}$:

$$\alpha_{pc}(0) \approx \left( m \cdot \frac{\frac{1}{N}\sum_{n=0}^{N}(|Re((H_f b_0)^* y_f[n])| + |Im((H_f b_0)^* y_f[n])|)}{(H_f b_0)^* H_f b_0} \right)^2, \quad (18)$$

where $y_f[n]$ is the despread HS-PDSCH symbol n for the strongest finger f, and $H_f b_0$ is the channel estimates for the finger f. As with Equation (15), the scaling factor m compensates for the fact that absolute values are used instead of power estimates to compute the power ratio, and depends on the modulation. For QPSK, m=1, m=$\sqrt{5/4}$ for 16 QAM, and m=$\sqrt{21/16}$ for 64 QAM.

Those skilled in the art will appreciate that the numerator of the quotient of Equation (18) is an estimate of the average received traffic symbol amplitude, although computed from soft value estimates obtained from a single finger. The denominator is a corresponding estimate of the CPICH pilot symbol amplitude, based on the same finger. Thus, the calculation of Equation (18) resembles that of Equation (15), but uses a symbol estimate obtained from a single Rake finger, rather than a symbol estimate obtained by combining multiple Rake fingers with combining weights. With this alternative solution, an estimate for $\alpha_{PC}$ that is not delayed a slot can be more easily obtained.

Another alternative approach is also based on the use of de-spread data obtained from a single, strongest Rake finger. As before, the delay estimation circuit 235 of FIG. 2 can identify the strongest finger f. The despread HS-PDSCH symbol estimate from that finger may be used to compute the absolute mean value of N symbols:

$$t_f = \frac{1}{2N}\sum_{n=0}^{N-1} y_f^*[n] y_f[n], \quad (19)$$

where $y_f[n]$ is the de-spread HS-PDSCH symbol n for finger f.

The corresponding pilot symbol amplitude may be computed, using the channel estimates $H_f$ for finger f:

$$n_f = \frac{1}{2M_0 M_1}\sum_{i=0}^{M_0-1}\sum_{j=0}^{M_1-1}(a_{0,i}H_f b_0 + a_{1,i}H_f b_1)^*(a_{0,i}H_f b_0 + a_{1,j}H_f b_1), \quad (20)$$

where $M_s$ is the number of constellation points for stream s, e.g., 16 for 16 QAM, or 64 for 64 QAM, and $\alpha_{s,i}$ is the complex value of constellation point i for stream s. The constellation points are normalized to have unit average power. $H_f b_0$ is the channel estimate for the finger f.

The power ratio $\alpha_{PC}$ can then be estimated as:

$$\alpha_{PC} \approx \frac{t_f}{n_f}. \quad (21)$$

Those skilled in the art will appreciate that the summation in Equation (20) can be quite complex to compute for larger modulation constellations like 64 QAM. However, Equation (20) can be re-written as:

$$n_f = C_1|H_f b_0|^2 + C_2|H_f b_1|^2 + C_3 Re(H_f b_0 \cdot (H_f b_1)^*), \quad (22)$$

where the constants $C_i$, i=1, 2, 3, can be pre-computed for the different modulation alternatives (QPSK, 16 QAM, 64 QAM). For instance, for 64 QAM, Equation (22) can be simplified to:

$$n_f = \frac{1}{2}(|H_f b_0|^2 + |H_f b_1|^2). \quad (23)$$

With the above alternative techniques for estimating the per-code traffic-to-pilot power ratio in mind, those skilled in the art will appreciate that FIG. 4 illustrates an exemplary method for estimating the per-code traffic-to-pilot power ratio for a multi-stream MIMO signal, and applying that power ratio to the computation of stream-specific combining weights and stream-specific signal metrics. The method illustrated in FIG. 4 may be implemented in the wireless receiver of FIG. 2, as discussed above, or in another wireless receiver configured to receive and process a multi-stream MIMO signal.

As shown at block 410, the process begins with the calculation of an average symbol amplitude from a plurality of de-spread traffic channel symbols received in at least a first transmission slot, such as a single slot of a W-CDMA HS-DSCH signal. In some embodiments, the average symbol is calculated according to Equation (14), although alternative formulations may be used in other embodiments. In some embodiments, a power level may be calculated, rather than an amplitude, from the de-spread traffic channel symbols.

As shown at block 420, a corresponding pilot symbol amplitude (or pilot symbol power level) is also calculated, based on an estimated propagation channel response and at least one of a plurality of preceding vectors used to generate the MIMO signal. In some embodiments, this calculation may be according to the denominator of the quotient in Equation (15), although alternative formulations may also be used.

As shown at block 430, a per-code traffic-to-pilot ratio may then be computed for the first transmission slot by dividing the average symbol amplitude (or power) obtained at block 410 by the corresponding pilot symbol amplitude (or power) obtained at block 420. As seen in Equation (15), this calculation may also include a scaling factor m that is specific to the modulation format, and may also require a squaring of the quotient to convert the result from an amplitude quantity to a power, or energy, quantity.

As shown at block 440, the per-code traffic-channel-to-pilot power ratio may be used to calculate stream-specific combining weights, e.g., according to Equations (9) and (10). Similarly, as shown at block 450, the per-code traffic-channel-to-pilot power ratio may be used to calculate stream-specific signal quality metrics, such as SINR, e.g., according to Equation (12).

Figures 6, 7:
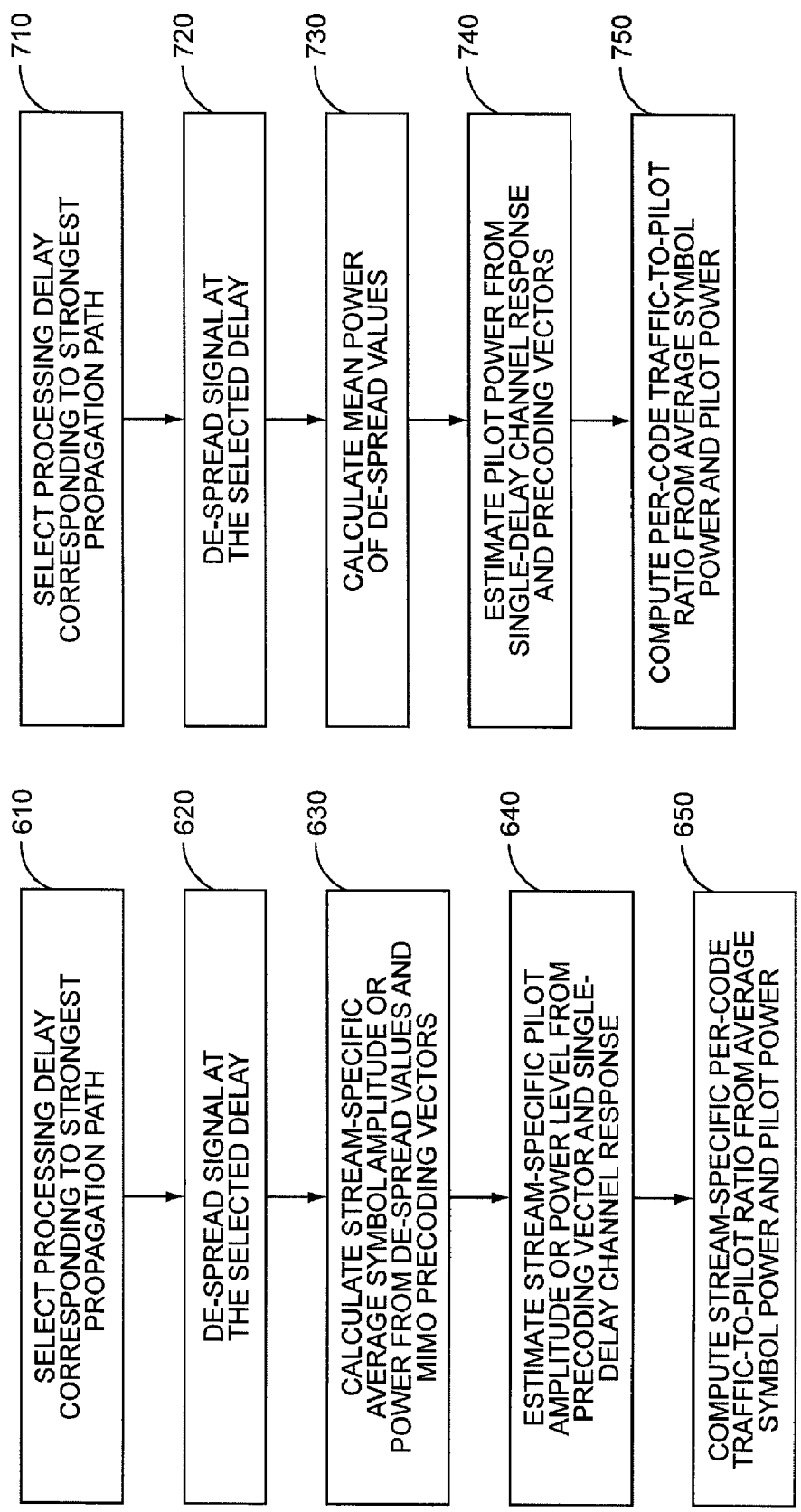
FIG. 6 is a process flow diagram illustrating another exemplary method of estimating stream-specific traffic-to-pilot power ratios, according to some embodiments of the invention.
FIG. 7 is another process flow diagram illustrating an exemplary method of estimating traffic-to-pilot power ratio for a MIMO signal.

FIGS. 5, 6, and 7 illustrate details of several variants of the general technique illustrated in FIG. 4 for estimating per-code traffic-to-pilot power ratio for a MIMO signal. Again, each of these techniques may be implemented in the wireless receiver of FIG. 2, or in another wireless receiver configured to receive and process a multi-stream MIMO signal.

The technique illustrated in FIG. 5 bases the average symbol amplitude calculation on traffic channel symbol estimates obtained by combining multiple de-spread samples with stream-specific combining weights. Thus, the process flow diagram begins at block 510 with the calculation of stream-specific combining weights, based on a previously obtained per-code power ratio value. As noted above, this previously obtained per-code power ratio value may be obtained from a previous slot, in some embodiments and/or under some circumstances, or may be derived from a previous TTI or as a weighted average of several previously obtained power ratios, in some embodiments, or may be estimated based on a signaled traffic-channel-to-pilot-channel parameter obtained from a base station. In still other embodiments, the previously obtained power ratio may be obtained based on a "dry run" of the current slot symbols through one of the power ratio estimation procedures described above.

In any event, the illustrated method continues, as shown at block 520, with the de-spreading of the received signal at a plurality of time delays (e.g., Rake fingers), to obtain de-spread values, and continues at block 530 with the combining of the de-spread values with the stream-specific combining weights. At block 540, the resulting combined traffic channel symbols are used to calculate a stream-specific average symbol amplitude, e.g., using the formulation of Equation (11). This calculation may be repeated for a second (or subsequent stream), using an appropriately modified version of Equation (14), to obtain stream-specific average symbol amplitudes for each stream, if desired.

At block 550, a stream-specific pilot symbol level is calculated, using the precoding vectors used to generate the MIMO signal and the stream-specific combining weights, e.g., according to the denominator of the quotient in Equation (15). Again, this calculation might be repeated for one or more additional streams, using the corresponding precoding vector and stream-specific combining weights. However, the stream-specific pilot symbol amplitude levels may be assumed to be equal in some embodiments. Finally, as shown at block 560, the stream-specific per-code traffic-to-pilot ratio may be computed, from the average traffic symbol amplitude and the estimated pilot symbol amplitude, e.g., according to Equation (15).

Process flow diagrams illustrating two exemplary per-code traffic-to-pilot power ratio estimation techniques based on a single processing delay (e.g., Rake finger) are illustrated in FIGS. 6 and 7. Those skilled in the art will appreciate that the first technique, illustrated in FIG. 6, permits the estimation of stream-specific traffic-to-pilot power ratios, while the second, illustrated in FIG. 7, results in a single per-code traffic-to-pilot power ratio that may be applied to both streams of a dual-stream signal.

Both techniques begin with the identification and selection of a processing delay that corresponds to the strongest propagation path, as shown at blocks 610 and 710 of FIGS. 6 and 7, respectively. Likewise, both techniques continue with the de-spreading of the received MIMO signal, at the selected delay, to obtain a single-delay de-spread value for each of a plurality of received traffic channel symbols, as shown at blocks 620 and 620 of FIGS. 6 and 7, respectively.

The process illustrated in FIG. 6 continues, as shown at block 630, with the calculation of a stream-specific average symbol amplitude (or power) from the de-spread values and the appropriate MIMO precoding vector. This calculation may take the form of the numerator of the quotient in Equation (18), in some embodiments, although other equivalent formulations may also be used. The stream-specific power ratio estimation procedure of FIG. 6 continues, as shown at block 640, with the estimation of stream-specific pilot symbol amplitude, based on the precoding vector and the single-delay propagation channel response estimate, e.g., according to the denominator of the quotient in Equation (18). Finally, the stream-specific per-code traffic-to-pilot ratio is calculated from the average symbol amplitude and the estimated pilot symbol amplitude, e.g., according to Equation (18).

The per-code power ratio process of FIG. 7 diverges from that of FIG. 6 beginning at block 730, which illustrates that the single-finger de-spread values obtained at block 720 are used to calculate an estimated average traffic symbol power based on the absolute mean power of the de-spread values, e.g., according to Equation (19). At block 740, a corresponding pilot power estimate is calculated based on the precoding vectors and the single-delay channel response, e.g., using one of Equations (20), (22), or (23). Finally, as shown at block 750, the per-code traffic-to-pilot ratio is calculated, e.g., using Equation (23), from the estimated average traffic symbol power and the estimated pilot power.

Those skilled in the art will appreciate that a particular technique may be selected and/or adapted from the above-described techniques according to the demands of a particular system or application, and/or according to design constraints imposed by the wireless receiver structure or design. Those skilled in the art will further appreciate that two or more of the above detailed techniques or variants thereof may be combined, in some embodiments. For example, the techniques illustrated in FIG. 5 may be most suitable, in some embodiments, for application to the second and third slots of a W-CDMA TTI, with another technique, such as the single-finger techniques of FIG. 7 and FIG. 8, applied to the first slot. Similarly, the filtering techniques discussed above may be applied to per-code power ratios obtained from any of the above estimation techniques, and may be selectively applied, in some embodiments, depending on which of the above techniques is used for a given slot.

With the above variations and examples in mind, those skilled in the art will appreciate that the preceding descriptions of various embodiments of methods and apparatus for processing a received multi-stream MIMO signal are given for purposes of illustration and example. As suggested above, one or more of the specific processes discussed above, including the process flows illustrated in FIGS. 4-7, may be carried out in a wireless receiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for estimating receiver frequency offset in a communications receiver. Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a wireless receiver for processing a received multi-stream multiple-input multiple-output (MIMO) signal, comprising:
    calculating an average symbol amplitude or average symbol power level from a plurality of de-spread traffic channel symbols received in a first transmission slot;
    estimating a corresponding pilot symbol amplitude or pilot symbol power level, based on an estimated propagation channel response and at least one of a plurality of precoding vectors used to generate the MIMO signal;
    computing a per-code traffic-channel-to-pilot power ratio for the first transmission slot by dividing the average symbol amplitude or average symbol power level by the corresponding pilot symbol amplitude or pilot symbol power level;
    wherein calculating an average symbol amplitude or average symbol power level from a plurality of de-spread traffic channel symbols received in a first transmission slot comprises:
        calculating stream-specific combining weights from the estimated propagation channel response, the precoding vectors used to generate the MIMO signal, and a previously calculated per-code power ratio computed for a prior transmission slot as a weighted average of per-code power ratios computed for two or more prior transmission slots;
        de-spreading samples of the received signal at each of multiple time delays and combining the de-spread samples using the stream-specific combining weights corresponding to a first stream of the MIMO signal, to obtain each of a plurality of combined traffic channel symbols; and
        calculating the average symbol amplitude or average symbol power level from the plurality of combined traffic channel symbols.

2. The method of claim 1 further comprising first calculating the stream-specific combining weights from the estimated propagation channel response, the precoding vectors used to generate the MIMO signal, and a previously calculated per-code power ratio estimated from a power ratio parameter signaled to the wireless receiver by a base station.

3. The method of claim 1, wherein estimating a corresponding pilot symbol amplitude or pilot symbol power level comprises calculating the estimated pilot symbol amplitude or pilot symbol power level as a function of the estimated propagation channel response, the precoding vector for a first stream of the MIMO signal, and stream-specific combining weights corresponding to the first stream of the MIMO signal.

4. A method in a wireless receiver for processing a received multi-stream multiple-input multiple-output (MIMO) signal, comprising:
    calculating an average symbol amplitude or average symbol power level from a plurality of de-spread traffic channel symbols received in a first transmission slot;
    estimating a corresponding pilot symbol amplitude or pilot symbol power level, based on an estimated propagation channel response and at least one of a plurality of precoding vectors used to generate the MIMO signal;
    computing a per-code traffic-channel-to-pilot power ratio for the first transmission slot by dividing the average symbol amplitude or average symbol power level by the corresponding pilot symbol amplitude or pilot symbol power level;
    further comprising calculating a filtered power ratio for the first transmission slot by computing a weighted average of the per-code traffic-channel-to-pilot power ratio for the first transmission slot and one or more per-code power ratios computed for prior transmission slots as a weighted average of per-code power ratios computed for two or more of the prior transmission slots.

5. The method of claim 4, further comprising computing stream-specific combining weights for a first stream of the MIMO signal as a function of the per-code traffic-channel-to-pilot power ratio for the first transmission slot, the estimated propagation channel response, and the precoding vectors used to generate the MIMO signal.

6. The method of claim 4, further comprising computing a stream-specific signal quality metric for the first stream of the MIMO signal as a function of the per-code traffic-channel-to-pilot power ratio for the first transmission slot, the estimated propagation channel response, and the precoding vector for the first stream of the MIMO signal.

* * * * *

UNITED STATES PATENT AND TRADEMARK OFFICE
CERTIFICATE OF CORRECTION

PATENT NO. : 8,411,780 B2
APPLICATION NO. : 12/391796
DATED : April 2, 2013
INVENTOR(S) : Jonsson et al.

It is certified that error appears in the above-identified patent and that said Letters Patent is hereby corrected as shown below:

In the Specification

In Column 1, Line 28, delete "preceding" and insert -- precoding --, therefor.

In Column 2, Line 25, delete "preceding" and insert -- precoding --, therefor.

In Column 3, Line 7, delete "preceding" and insert -- precoding --, therefor.

In Column 3, Line 38, delete "preceding" and insert -- precoding --, therefor.

In Column 3, Line 43, delete "preceding" and insert -- precoding --, therefor.

In Column 5, Line 18, delete "preceding" and insert -- precoding --, therefor.

In Column 5, Line 29, delete "preceding" and insert -- precoding --, therefor.

In Column 6, Line 7, delete "$R_{steam0}$" and insert -- $R_{stream0}$ --, therefor.

In Column 6, Line 37, delete "a" and insert -- $\alpha$ --, therefor.

In Column 10, Line 34, delete "a" and insert -- $\alpha$ --, therefor.

In Column 11, Line 64, in Equation (20), delete " $\dfrac{1}{2M_0 M_1} \sum_{i=0}^{M_0-1} \sum_{j=0}^{M_1-1} (a_{0,i} H_f b_0 + a_{1,i} H_f b_1)^*$ " and insert -- $\dfrac{1}{2M_0 M_1} \sum_{i=0}^{M_0-1} \sum_{j=0}^{M_1-1} (a_{0,i} H_f b_0 + a_{1,j} H_f b_1)^*$ --, therefor.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,411,780 B2

In the Specification

In Column 12, Line 51, delete "preceding" and insert -- precoding --, therefor.

In Column 13, Line 45, delete "preceding" and insert -- precoding --, therefor.